Patented Apr. 16, 1946

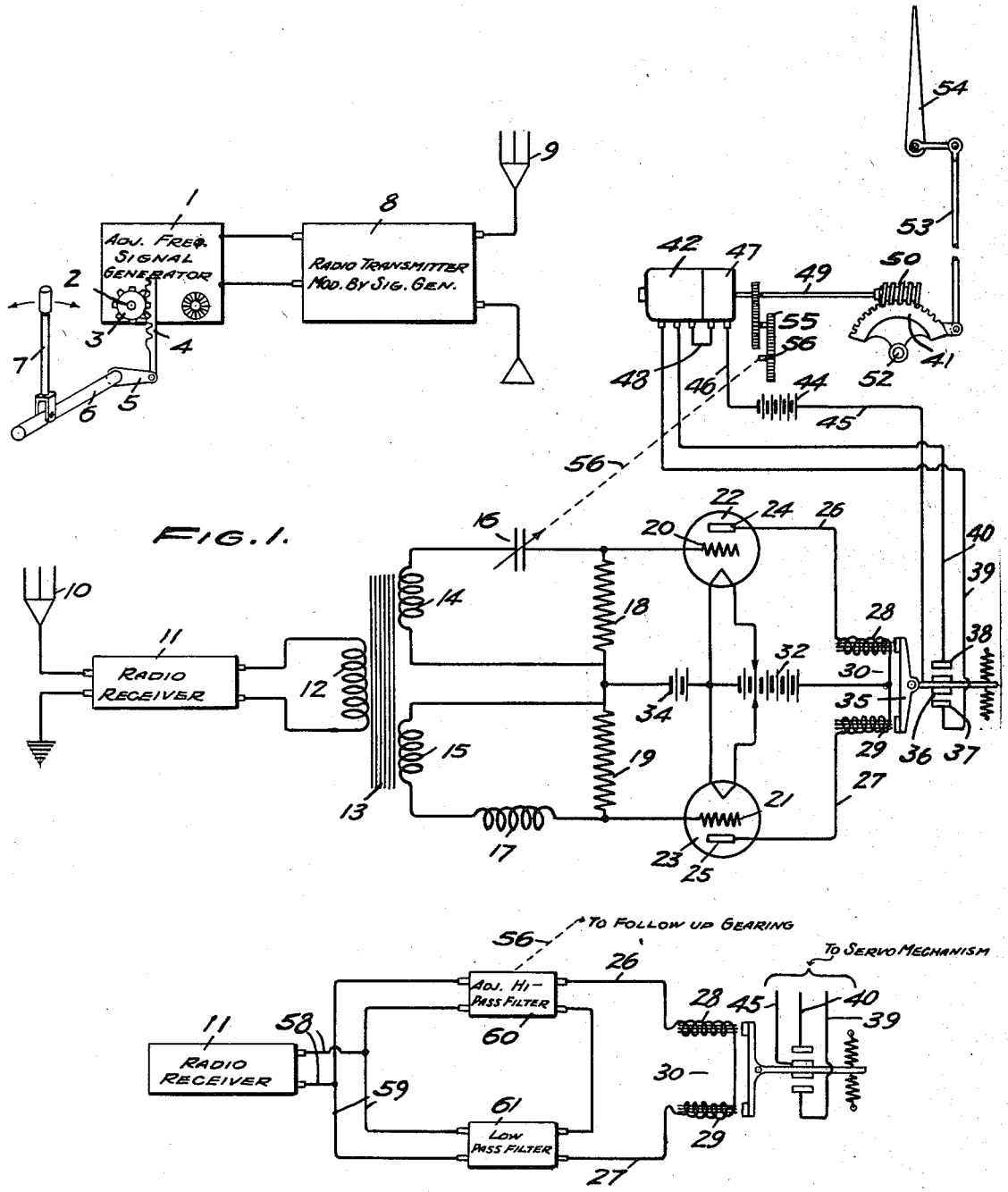

2,398,419

UNITED STATES PATENT OFFICE 2,398,419

RADIO OPERATED POSITIONING CONTROL SYSTEM

Harvey J. Finison, Dayton, Ohio

Application August 17, 1943, Serial No. 498,975

4 Claims. (Cl. 250—2)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio operated positioning control devices and relates in particular to a type of such control wherein the element to be controlled may be displaced an amount equal or proportional to the displacement of a control element at the remote controlling station.

Many radio remote control devices have been proposed in the prior art in which the position of the controlled object such as an aircraft elevator or ship's rudder could be displaced from a neutral position to any one of a limited number of predetermined positions by coded impulses or by selected transmission frequencies operating selector relays, but such systems require a large amount of receiving apparatus if the number of controlled object positions is increased. It has further been proposed to establish position of the controlled object by variation in the time or successive number of impulses transmitted, which has the disadvantage that the rate of response is slow and uncertainty exists as to exactly what position the controlled object is in at the cessation of signal transmission unless a complicated answer-back apparatus is employed to transmit a signal indicative of the position of the controlled object to the remote transmitting station.

In accordance with the present invention a continuous radio signal is transmitted from the control station, and its frequency is varied in either sense from a standard frequency to cause deflection of the controlled element in a corresponding sense from the neutral position. A radio receiver picks up the transmitted control signal and feeds the amplified output to a discriminating network which is operative to control a sensing relay to energize power means for positioning the controlled object, the discriminating network being such that the unbalance thereof operative to energize the sensing relay is a function of the variation in the transmitted frequency from the predetermined value. Means are provided responsive to the position of the controlled object from a predetermined or neutral position to cancel the effect of the unbalance of the network and to alter the balance point so that it corresponds to the new value of the transmitted frequency so that the power means is deenergized when the controlled object has been displaced an amount proportional to the change in frequency of the transmitted wave so that the position of the controlled object is always positively determined and no further operation of the power positioning means will take place as long as the frequency of the transmitted signal remains unchanged. By means of this system of control, the primary control element at the transmitting station can be operative to vary the transmitted signal frequency from the predetermined value in accordance with the displacement of the control element from a neutral position, and the controlled object will be correspondingly displaced from the neutral position with a rapidity dependent only on the power available for positioning purposes.

The principal object of the invention is to provide a radio remote control device including a transmitting and receiving station such that variation in the frequency of control signals transmitted from the transmitting station from a predetermined frequency will cause a positioning of a controlled object at the receiving station in a direction and amount corresponding in the direction and amount of the change in frequency of the transmitted signal from the predetermined value.

Another object of the invention is the provision in a radio remote control system of a transmitter adapted to have the frequency of the signal radiated thereby varied above or below a predetermined value, a remote receiver adapted to receive the transmitted signal, a frequency difference responsive network adapted to be selectively unbalanced by the output of said receiver upon a variation in the received signal frequency from said predetermined value, a relay selectively actuated by the unbalance of said network, power operated positioning means controlled by said relay, and means including a follow-up connection with said positioning means for restoring the balanced condition of said network at the new value of the transmitted frequency when the controlled object has been positioned at a desired point.

Other objects of the invention will become apparent by reference to the detailed description hereinafter given and to the appended drawing in which:

Fig. 1 is a schematic illustration of one form of the invention; and

Fig. 2 is a diagrammatic illustration of a modified discriminating circuit network for use in the system of Fig. 1.

Referring now to Fig. 1, the reference numeral 1 generally indicates an adjustable frequency signal generator which may, for example, comprise a conventional audio frequency oscillator, the frequency of which may be adjusted by variation of the inductance or capacity of the resonant circuit in a manner well-known in the art, the adjustable frequency control being adapted to be actuated by means of a shaft 2 rotated by a gear 3 fixed thereon and in turn moved by a rack 4 which may be connected by means of a lever 5 mounted on a rock shaft 6 which is actuated by a primary control element 7 such as to simulate the control stick of an aircraft. By movement of the control element 7 in either direction from a neutral position, the frequency of the output of the signal generator 1 may be either increased or decreased from a predetermined value corresponding to the neutral position of the control element 7. The output of the signal generator 1 is fed to a conventional radio transmitter such that the carrier wave output of the transmitter is modulated by the output of the adjustable frequency signal generator 1, the modulation of the carrier wave preferably being at an audio frequency. The output of the radio transmitter 8 is fed to a conventional antenna 9 for radiation into space. It is thus seen that as the control element 7 is moved in either direction from a neutral position, the modulation of the carrier wave radiated by the antenna 9 will either increase or decrease from a predetermined value corresponding to the neutral position of the control element 7 in accordance with the magnitude and direction of displacement of the control element. This variation in frequency is utilized in controlling the position of a movable object located at a remote point, as will now be described.

The modulated radiation of the antenna 9 is adapted to be received on a conventional antenna 10 located at the remote station, which is led to a conventional radio receiver 11, in which the modulated component of the carrier wave transmitted from antenna 9 is detected and amplified in a manner well-known in the art, the output of the receiver 11 being impressed on the primary coil 12 of a transformer generally indicated by the reference numeral 13. The transformer 13 is provided with two secondary coils 14 and 15 respectively, each of which forms a part of the separate discriminating circuit as will now be described. The transformer secondary 14 has one side thereof connected in series with a variable condenser 16, and the terminals of the secondary 14 are connected across a load resistor 18, and the side thereof containing the condenser is connected to the grid 20 of a vacuum tube 22. In similar fashion the transformer secondary 15 has one side thereof connected in series with an inductance 17 and connected to a grid 21 of a vacuum tube 23, a load resistor 19 being shunted across the output terminals of the secondary 15 beyond the inductance 17, and the load resistors 18 and 19 being connected together to a conventional C battery 34 which supplies a biasing potential on the grids 20 and 21 of the vacuum tubes 22 and 23 such that they are biased at or near the cut off point. A conventional A and B battery supply 32 supplies the necessary current to the filament and plate circuits of the vacuum tubes 22 and 23. The plates 24 and 25 of the respective vacuum tubes 22 and 23 are connected by means of conductors 26 and 27 to the coils 28 and 29 of a differential relay generally indicated by the reference numeral 30, the relay 30 including a rocking armature 35 provided with a contact arm upon which is mounted a central contact 36 suitably biased by springs to a normal neutral position and the contact 36 being adapted to engage either of a pair of oppositely spaced motor controlling contacts 37 and 38 respectively, which are connected by means of conductors 39 and 40 respectively to the field coils of a conventional split field reversible electric motor 42. A battery 44 supplies current by means of conductor 45 to the central contact 36 and is connected by means of a conductor 46 in series with a conventional electromagnetic clutch 47 which is connected in series by means of conductor 48 to the armature circuit of the motor 42. The electromagnetic clutch 47, which may be of any well-known type, is adapted, upon the passing of current therethrough upon energizing of the motor 42, to run in either direction to connect the armature of the motor to a shaft 49 to rotate the same in the same sense as the rotation of the motor, and upon the deenergizing of the motor will cause an uncoupling of the shaft 49 from the motor 42, this arrangement being provided so that overrunning of the motor 42 will have no effect upon causing further positioning of the shaft 49, and thereby hunting is eliminated. The shaft 49 is provided with a worm 50 which is adapted to engage a worm gear sector 41 which is rotatably mounted as at 52 and connected by means of an arm 53 to move a controlled object 54 which may be an aircraft control surface, ship's rudder, or the like. Rotation of shaft 49 in either direction will cause a displacement of the controlled object 54 in a corresponding direction from a neutral position.

As previously noted, the condenser 16 was indicated as being a variable condenser, and reduction gearing generally indicated by the reference numeral 55 is provided to be driven by the shaft 49 and terminates in an output shaft 56 which is adapted to be connected to the variable condenser 16 so as to change the setting thereof, the reduction gearing 55 and shaft 56 forming what is known in the art as a follow-up connection.

The circuit including the transformer secondary 14, condenser 16, load resistor 18 and vacuum tube 22 forms a discriminating circuit in which the voltage appearing on the grid 20 of vacuum tube 22 is a function of the frequency of the current induced in the transformer secondary 14. The voltage appearing across load resistor 18, and hence the voltage on grid 20, will depend on the reactance in the branch of the circuit containing the condenser 16. The condenser 16, since it is variable, will pass currents of higher frequency more readily than currents of lower frequency, depending upon its adjusted capacity value; i. e., the capacitive reactance increases as the frequency is reduced from the value corresponding to the present value of the capacity, and the capacitive reactance decreases for higher frequencies. The conditions for the circuit including transformer secondary 15, load resistor 19, and inductance 17 is the converse of the above in that the voltage across the load resistor 19 and appearing on grid 21 will depend on the reactance of inductance 17, which will increase as the frequency of the currents passing therethrough increases and will decrease its reactance as the current frequency is reduced.

For each setting of the condenser 16, between predetermined limits, there will be one value of current frequency for which the reactances of both circuits will be alike, and under which conditions the voltages on the grids of vacuum tubes 22 and 23 will be equal, and therefore the currents fed to relay coils 28 and 29 will be equal and the relay armature 35 will remain in its neutral position. If the frequency of the modulated component of the carrier wave received on antenna 10 is increased above the predetermined value for which the reactances of the discriminating circuits are equal, then the circuit including transformer secondary 14 and condenser 15 will be less affected by the change in frequency; that is, its reactance in the circuit including the inductance 17, and accordingly the voltage appearing on grid 20, will exceed the voltage occurring on grid 21 and will cause an unbalance of the currents supplied to relay coils 28 and 29, resulting in the armature 35 being attracted towards the relay coil 28, which will cause the central motor controlling contact 36 to engage the contact 38 to energize the motor 42 to run in one direction, causing a displacement of the controlled object such as the aircraft control surface 54 in a corresponding direction from the neutral position. As the motor 42 continues to operate, the reduction gearing 55 will rotate shaft 56 in such a direction that the capacity of condenser 16 will be so altered that the capacitive reactance of the circuit including the said condenser will be brought into equality with the inductive reactance of the circuit including transformer secondary 15 and inductance 17, and when equality of the reactance of the circuits is again established, the voltages on grids 20 and 21 will again be the same, and the relay armature 35 will return to the neutral position and deenergize motor 42 and simultaneously declutch the motor by means of electromagnetic clutch 47 from driving relation with shaft 49 so that further positioning of the controlled object 54 will cease. It is thus seen that a definite change in frequency of the output of radio receiver 11 from a predetermined frequency will cause a corresponding proportional deflection of the controlled object 54, and the discriminating circuits will be brought into balance such that their neutral or balance frequency corresponds to the value of the received output frequency appearing on transformer primary 12. The entire system then being in equilibrium, nothing further will happen until the received frequency appearing on transformer primary coil 12 is further altered.

An exactly opposite effect will take place if the frequency of the receiver output appearing on the transformer primary coil 12 is decreased from a predetermined value, corresponding to the neutral position of primary control element 7, since in this case the reactance of the inductive reactance circuit including inductance 17 will be decreased from the value of the capacitive reactance and the voltage on grid 21 will exceed the voltage appearing on grid 20, causing the differential relay 30 to operate in the opposite sense and cause through operation of motor 42 a deflection of the controlled object 54 in the reverse sense from that as described above. Also the follow-up effect derived from rotation of shaft 56 will vary the capacity of variable condenser 16 in the opposite sense such that the capacitive reactance thereof will be decreased until a balance is again effected between the two discriminating circuits, and further operation of motor 42 will then cease in the same manner as above described. It is therefore seen that the controlled object 54 may be made to follow any change in received frequency appearing on primary coil 12 from a predetermined value. In other words, for every value of received frequency, there is a corresponding position of the controlled object 54, and the controlled object will be moved from whatever position it should then happen to have until the same has reached the said corresponding position, and when in such position the equilibrium value of the discriminating circuits will be brought into coincidence with the received frequency appearing on the transformer primary coil 12 and all further positioning will cease.

Obviously if the structure at the receiving station is properly arranged and tuned, the frequency corresponding to the neutral position of the controlled object 54 may be made to match exactly the frequency of the signal generator 1 when the control element 7 is in a corresponding neutral position, and by movement of the control element 7 in one direction from said neutral position, the frequency of the signal generator 1 may, for example, be reduced in an amount proportional to the deflection of the control member 7 from the said neutral position, which in turn will cause a corresponding change in the frequency of the output of the radio receiver 11 at the remote station which, through the discriminating circuits, will then set motor 42 into operation to position the controlled object 54 an amount proportional to the deflection of the primary control member 7 from the neutral position, and in a similar fashion deflection of the control member 7 in the opposite sense will cause a corresponding deflection of the controlled object from a neutral position.

It will be seen from the above that an operator at a remote transmitting station may operate a control element and have a corresponding deflection of a controlled object at a remote point, and the system at the remote station is such that upon the controlled object reaching the desired position, the servo mechanism actuating the same will be deenergized. It is then immaterial for what length of time the same signal is transmitted, since no further change in the position of the controlled object will ensue; but as soon as the position of the controlling element 7 is changed the mechanism at the remote station will cause movement of the controlled object until the same is brought into a corresponding or proportional position. It is obvious that in the operation of this system, coded signals or transmission of signals for predetermined intervals of time are not required and the operator can operate the controlling element 7 in the same manner, for example, as he would operate the control stick of an airplane to cause deflection of the controlled element at the remote station and by the duplication of the complete system as shown, as many controlled objects may be actuated as desired by such separate systems, each of which will follow a definite movement of the control element 7, rudder pedals or the like, so as to render the control of an aircraft or ship at a remote point exactly the same as if the controlled element were directly actuated by the primary control element 7 or equivalent control means.

It is seen that upon unbalance of the equilibrium frequency of the discriminating circuits, the servomotor 42 will be energized to run in either of two directions to cause the displacement of the controlled object, and at the same time the motion of the control object is feeding back through the follow-up mechanism to bring the reactance values of the discriminating circuits again into balance, and this balance frequency will in all cases correspond to the modulation frequency of the then transmitted signal as modulated by the signal generator 1; that is, the equilibrium value of the discriminating circuits will always tend to approach the value of the frequency of signal generator 1, and by this means proportional movement of the controlled object is assured.

It is obvious that the discriminating circuits illustrated and described with reference to Fig. 1, while operating purely on change of reactance, have somewhat the characteristics of filter circuits so that in lieu thereof actual frequency responsive tuned filters may be employed to actuate the relay 30 and such a modification of the discriminating circuit of the device of Fig. 1 is illustrated in Fig. 2. Referring now to Fig. 2, the output of the radio receiver 11 is led by means of conductors 58 into parallel connected conductors 59, the output of which is led to filters 60 and 61. The filter 60, for example, may be made adjustable as to the frequency which it will pass and will normally pass a current having a frequency equal to or above the frequency corresponding to the signal generator frequency of the device of Fig. 1 for the neutral position of the control column 7, and in a similar manner the filter 61 will be adapted to pass all currents having frequency less than the said predetermined value. The outputs of the filters 60 and 61 are connected directly by means of conductors 26 and 27 to the differential relay 30 for operation of the same to control the servo mechanism of Fig. 1 in the same manner as previously described. Upon the receiving of a signal by the receiver 11 the amplified output thereof will be fed to the respective filters 60 and 61, and if differing from the then adjusted value for balance, will cause differential relay 30 to operate in one direction or the other depending upon whether the change in frequency is above or below the value for balance existing just prior to the receiving of the signal; that is, if the frequency is increased, relay coil 28 will have a predominating effect, while if the frequency is decreased, relay coil 29 will have a predominating effect. By means of the follow-up connection 56 the equilibrium value between the filters 60 and 61 can be so adjusted that the equilibrium value will always tend to become equal to the transmitted signal frequency of the signal generator of Fig. 1, and accordingly this system will also operate to effect the same results as the device of Fig. 1 and may be bodily inserted therein in place of the discriminating circuit arrangement shown therein.

While the system above described with reference to Fig. 1 has been disclosed as employing an audio frequency modulated carrier wave, it is obvious that the frequency of the carrier wave itself may be altered directly and a frequency modulated receiver employed in place of the radio receiver 11, and in using this system the results will be identical to that as described above since the output of the receiver 11 can be made to vary in frequency in the same manner as if an audio frequency modulation of the carrier wave had been employed, and the discriminating circuits will operate in the same manner as previously described.

It will be further apparent with respect to the device illustrated in Fig. 1 that in place of employing a variable condenser 16 actuated by the follow-up shaft 56, the same result can be attained by making the condenser 16 of fixed capacity and varying the inductance 17, the inductance varying means being actuated by the follow-up shaft 56, and in fact, where very low audio frequencies are employed, this mode of operation might be preferable to that illustrated in the drawing.

It will be apparent to those skilled in the art that many changes may be made in the form of the invention as illustrated and described, and without departing from the spirit of the invention as described in the appended claims.

I claim:

1. A radio controlled device for positioning a controlled object in response to a change in frequency of a signal transmitted from a remote point comprising a radio receiver responsive to the transmitted signal, the output of said receiver changing in frequency proportional to the change in frequency of the transmitted signal, a frequency responsive discriminating network connected to the output of said receiver, a differential relay operated by the output of said network, said network being normally balanced and operative upon a change in frequency to actuate the relay in a sense depending on the direction of the change in frequency from the then existing balanced condition, reversible servo mechanism adapted to be selectively energized by said relay, a controlled object positioned by said servo mechanism, adjustable balancing means associated with said network, and a follow-up connection between said servo mechanism and said adjustable balancing means operative to bring said network into balance with the frequency of the transmitted signal upon the servo mechanism positioning the controlled object in a predetermined position, whereby balancing of said network will cause said differential relay to deenergize said servo mechanism.

2. The structure as claimed in claim 1, in which said network includes two reactive circuits connected to the output of said receiver, the reactance of one of said circuits being capacitative and the reactance of the other circuit being inductive, and means for varying the reactance of one of said circuits whereby the equilibrium frequency for balance between said circuits may be altered between predetermined limits.

3. The structure as claimed in claim 1, in which said frequency responsive network comprises a pair of tuned filter circuits normally balanced such that each will pass currents of a predetermined frequency but respectively reject currents having a frequency greater and less than said predetermined frequency and means for varying the tuning of one of said filters so that the equilibrium frequency of said network may be varied between predetermined limits.

4. A radio controlled device for positioning a controlled object in response to change in frequency between predetermined limits in signals transmitted from a remote point, comprising a radio receiver responsive to the transmitted signals, a frequency responsive discriminating network connected to the output of said receiver, a relay connected to the network and operated by unbalance of the electrical condition thereof upon a change in the frequency of the transmitted signals, servo mechanism for positioning a controlled object and selectively controlled by said relay, a follow-up drive actuated by said servo mechanism, mechanically adjustable means forming part of said network for altering the electrical balanced condition thereof and a connection between said follow-up drive and said mechanically adjustable means, said follow-up drive causing a change in the balance frequency of said network which causes the balance frequency to attain a value equal or proportional to the frequency of the transmitted signals.

HARVEY J. FINISON.